United States Patent
Zende

(10) Patent No.: US 7,742,287 B2
(45) Date of Patent: Jun. 22, 2010

(54) APPARATUS FOR DISPLAY MOVEMENT OF A LAPTOP COMPUTER

(75) Inventor: Sandeep Sham Zende, Maharashtra (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/173,866

(22) Filed: Jul. 16, 2008

(65) Prior Publication Data

US 2010/0014233 A1      Jan. 21, 2010

(51) Int. Cl.
  *G06F 1/16*      (2006.01)
(52) U.S. Cl. ............... 361/679.06; 345/156; 248/274.1; 108/2
(58) Field of Classification Search ............ 108/2; 345/111, 156, 204, 1.1; 455/575.1; 248/274.1, 248/323, 125.5; 16/324; 361/679.06, 679.07, 361/679.22, 679.27
See application file for complete search history.

(56) References Cited

U.S. PATENT DOCUMENTS

| | | | | |
|---|---|---|---|---|
| 5,357,870 | A | * | 10/1994 | Guichard et al. ............... 108/2 |
| 6,950,089 | B1 | * | 9/2005 | Jaeger ......................... 345/111 |
| 7,245,948 | B2 | | 7/2007 | Jung et al. |
| 7,308,733 | B2 | | 12/2007 | An et al. |
| 2003/0202003 | A1 | | 10/2003 | Marmaropoulos et al. |
| 2004/0070942 | A1 | * | 4/2004 | Tomioka et al. .............. 361/700 |
| 2006/0282985 | A1 | | 12/2006 | Lu |

* cited by examiner

*Primary Examiner*—Hung V Duong
(74) *Attorney, Agent, or Firm*—David A. Mims, Jr.

(57) ABSTRACT

Disclosed is a laptop computer including a body and a display articulably connected to the body. The laptop computer includes at least one drive unit capable of moving the display relative to the body.

3 Claims, 5 Drawing Sheets

APPARATUS FOR DISPLAY MOVEMENT OF A LAPTOP COMPUTER

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to laptop computers, and particularly to movement of a laptop computer display.

2. Description of Background

Laptop computers commonly include a hinge mechanism which allows for articulation of a laptop display up to 180 degrees from the laptop keypad about a hinge axis to "open" or "close" the laptop. Some laptops include a hinge mechanism which allows for side-to-side rotation of the display about a rotation axis perpendicular in addition to the articulation about the hinge axis. The movement of the display is accomplished manually, usually be grasping a portion of the display and pushing or pulling to rotate the display to the desired position. This requires moving a hand from the laptop keypad to move the display, which may be inconvenient if adjustment is required or desired often due to, for instance, changing ambient light conditions or user viewing position.

SUMMARY OF THE INVENTION

The shortcomings of the prior art are overcome and additional advantages are provided through the provision of a laptop computer including a body and a display articulably connected to the body. The laptop computer includes at least one drive unit capable of urging movement of the display relative to the body. A method for moving the display relative to the body is also disclosed.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which accomplishes movement of a laptop computer display to suit a viewer's position. The movement of the display is accomplished without a user needing to remove the user's hands from the keypad of the laptop computer.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
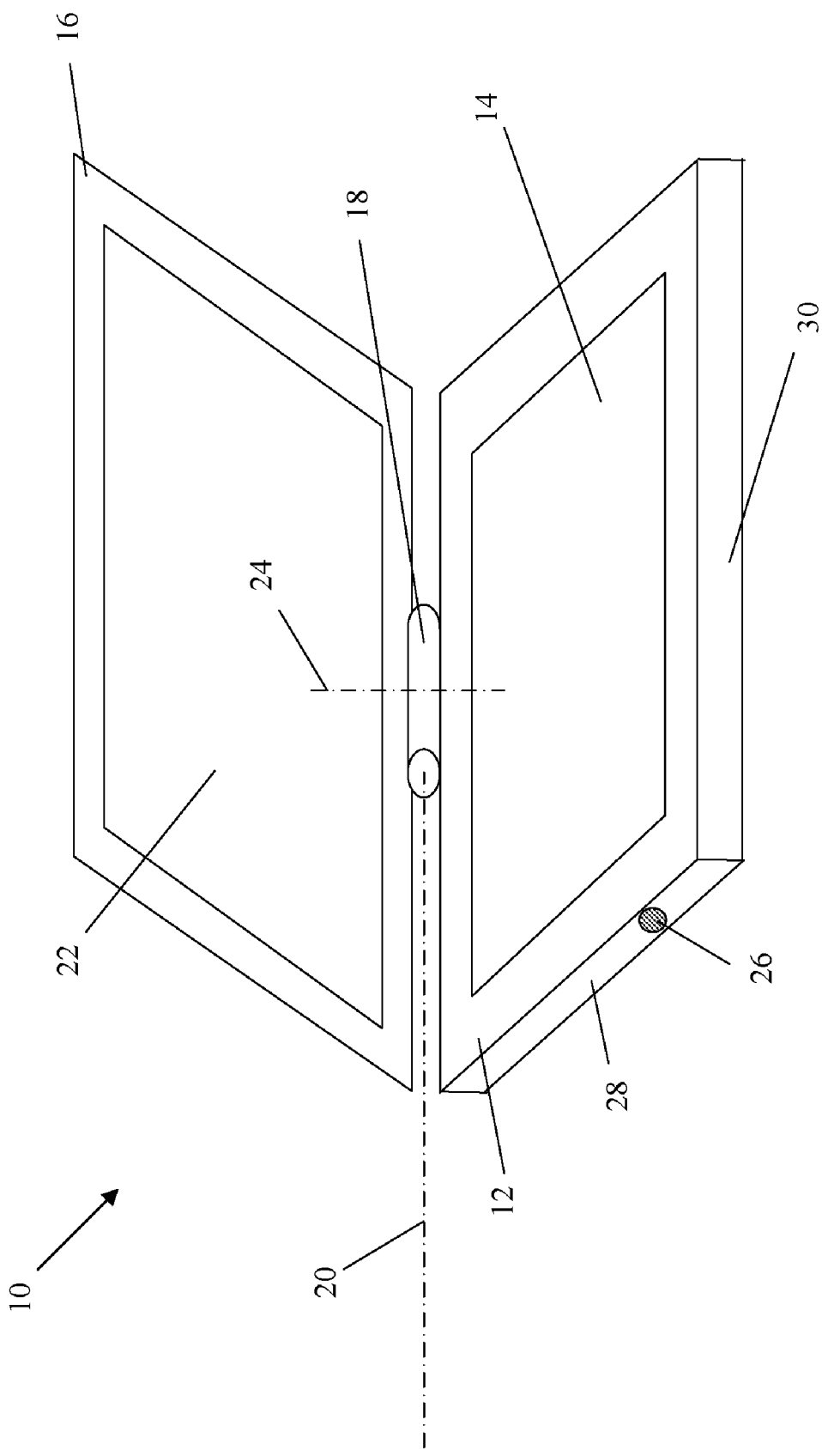
FIG. 1 is a perspective view of an embodiment of a laptop computer.

Turning now to the drawings in greater detail, it will be seen that in FIG. 1 there is an embodiment of a laptop computer 10. The laptop computer 10 includes a main body 12 having a keypad 14, and a display 16. The main body 12 and the display 16 are connected via a hinge mechanism 18. The hinge mechanism 18 is configured with a hinge axis 20 which allows for opening and closing of the laptop computer 10 by rotation about the hinge axis 20. To open the laptop computer 10, a display face 22 is rotated away from the keypad 14, and to close the laptop computer 10, the display face 22 is rotated toward the keypad 14.

In some embodiments, the hinge mechanism 18 includes a rotation axis 24, which in some embodiments is substantially perpendicular to the hinge axis 20. When the display 16 is rotated about the rotation axis 24, the display 16 rotates in a side-to-side manner across the keypad 14.

Figure 2:
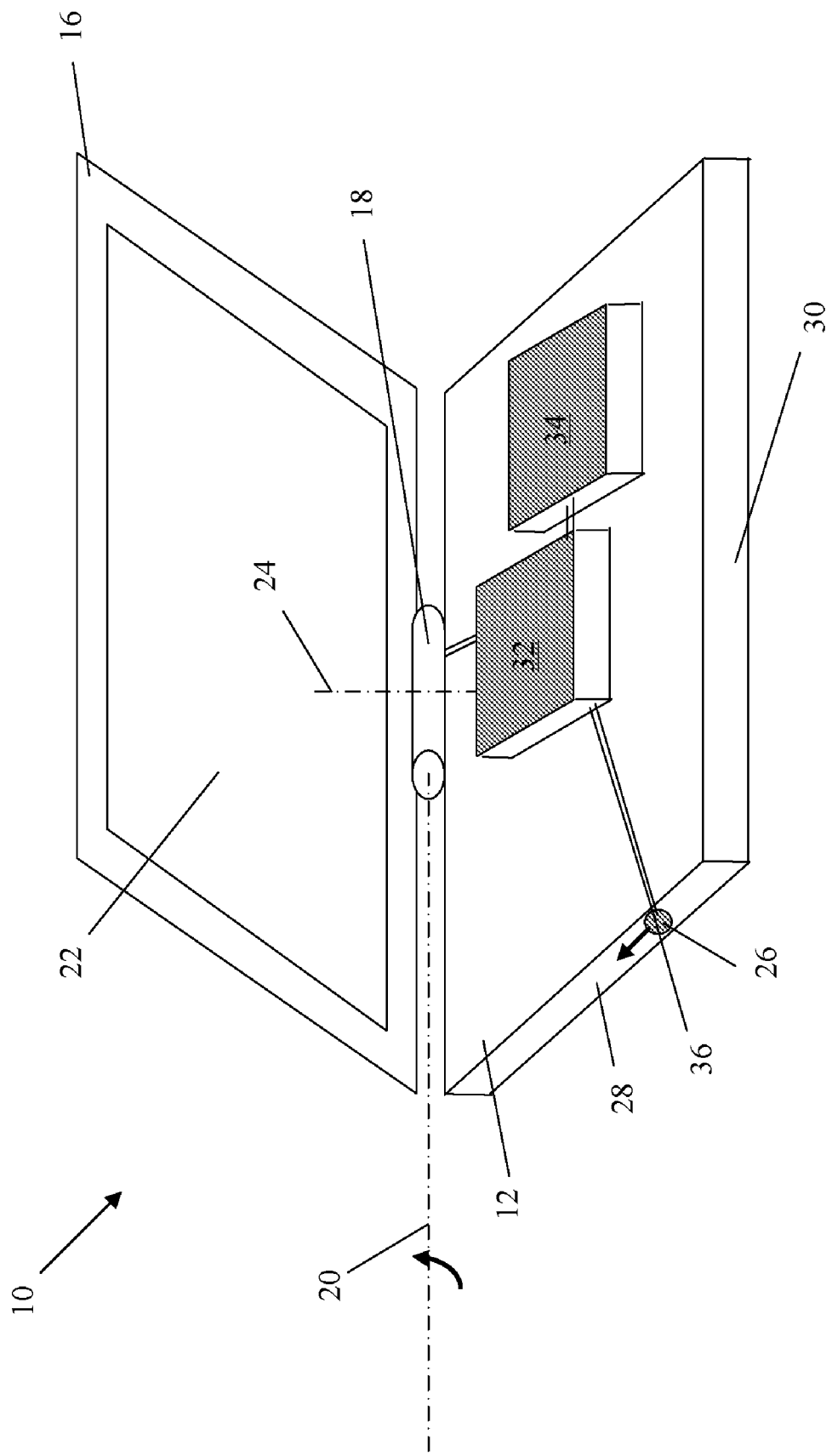
FIG. 2 illustrates a partial view of the laptop computer of FIG. 1.

The laptop computer 10 includes one or more activators, for example one or more buttons 26, to direct movement of the display 16 about the hinge axis 20 and about the rotation axis 24. The embodiment of FIG. 1 includes a single button 26 which is disposed at a side face 28 of the main body 12. It is to be appreciated, however, that other button 26 locations including a front face 30 of the main body and the keypad 14 are contemplated within the scope of this disclosure. Referring to FIG. 2, each button 26 is connected to one or more drive units, for example motors 32 which direct motion of the display 16 based on input received from the one or more buttons 26. In some embodiments, the motors 32 of FIG. 1 are powered by a laptop battery 34, but it is to be appreciated that other power sources are contemplated within the scope of this disclosure.

Figure 3:
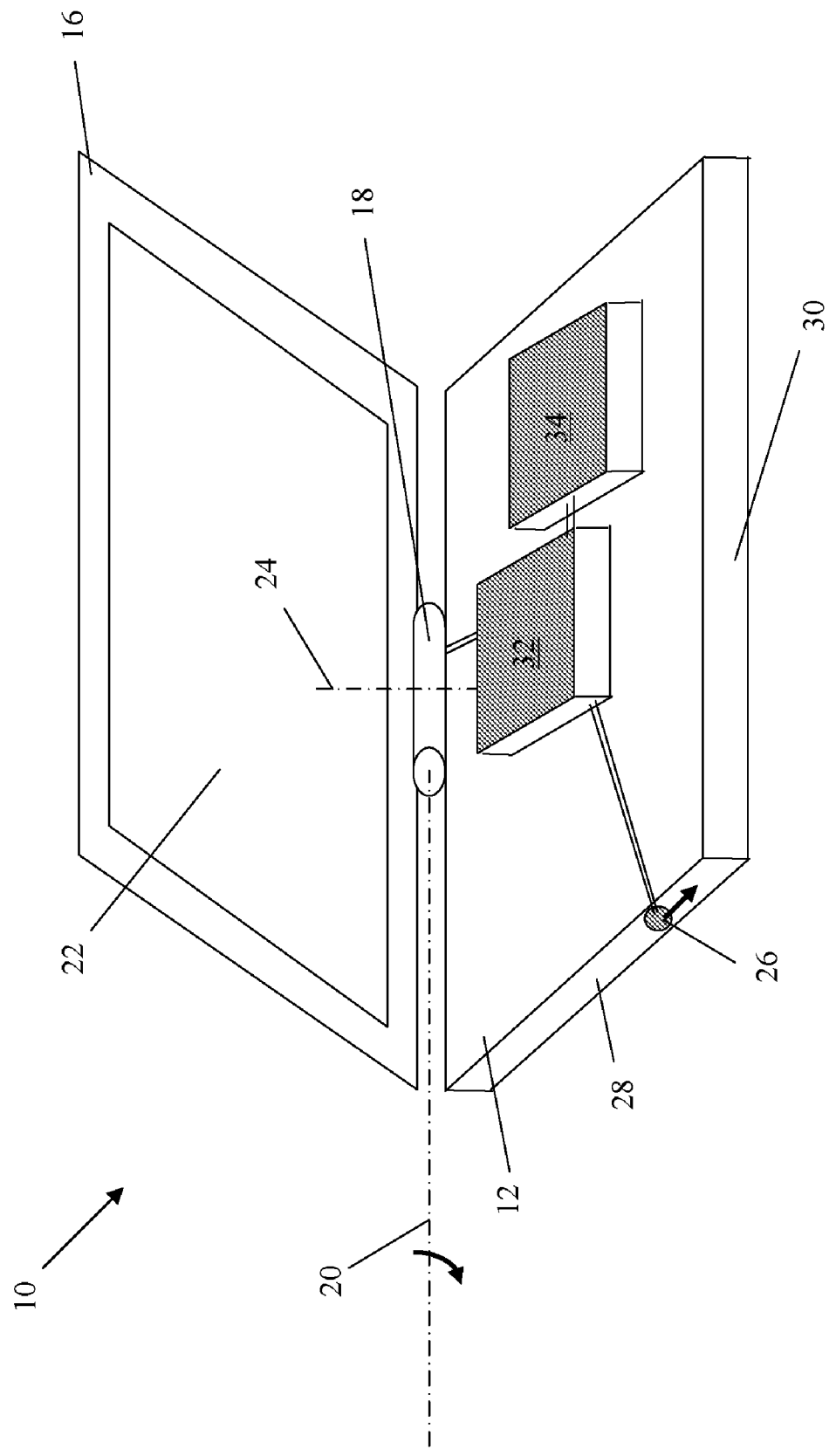
FIG. 3 illustrates the laptop computer of FIG. 1 with a display in rotation about an axis.
Figure 4:
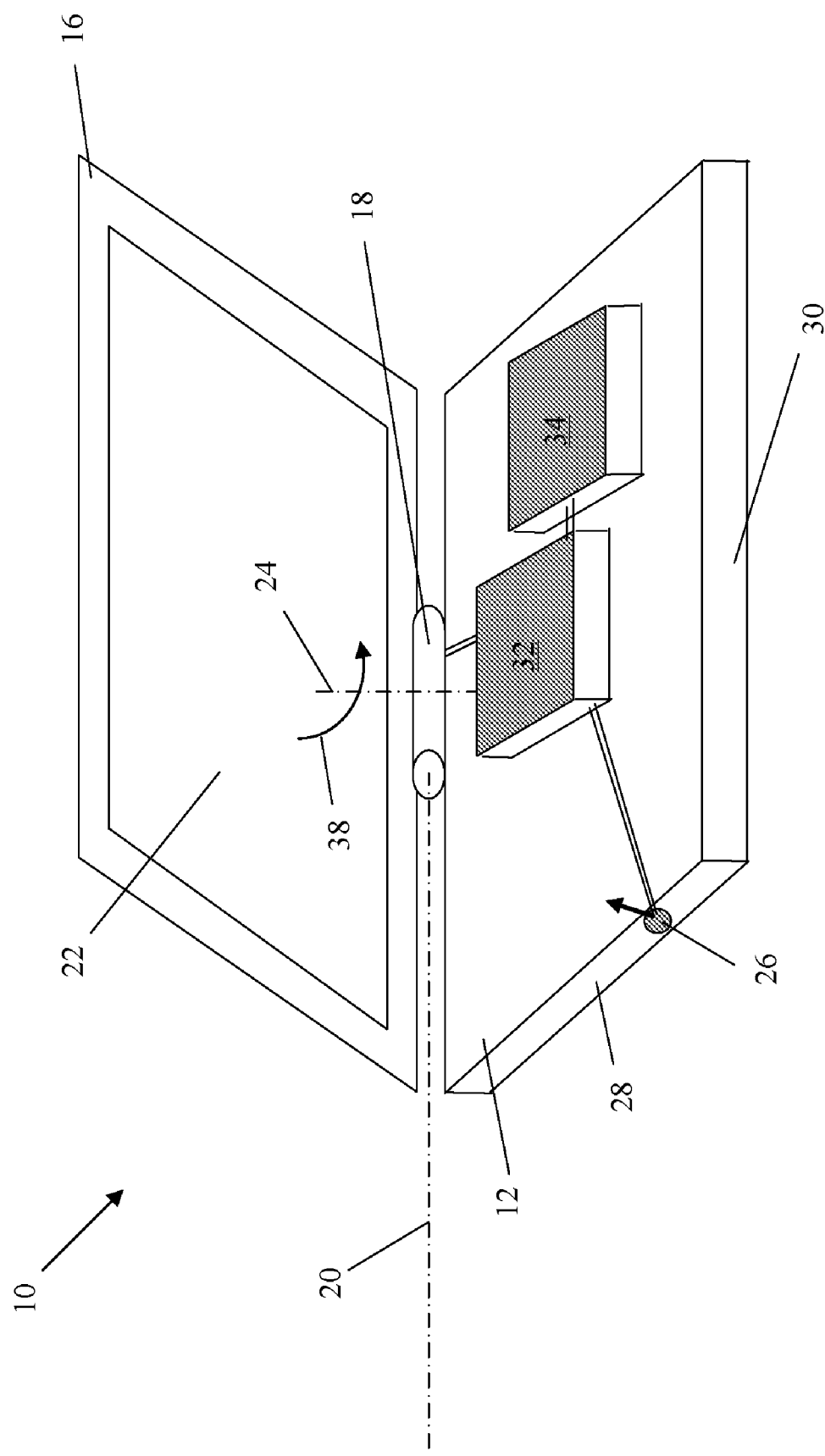
FIG. 4 illustrates the laptop computer if FIG. 1 with a display in rotation about a second axis.
Figure 5:
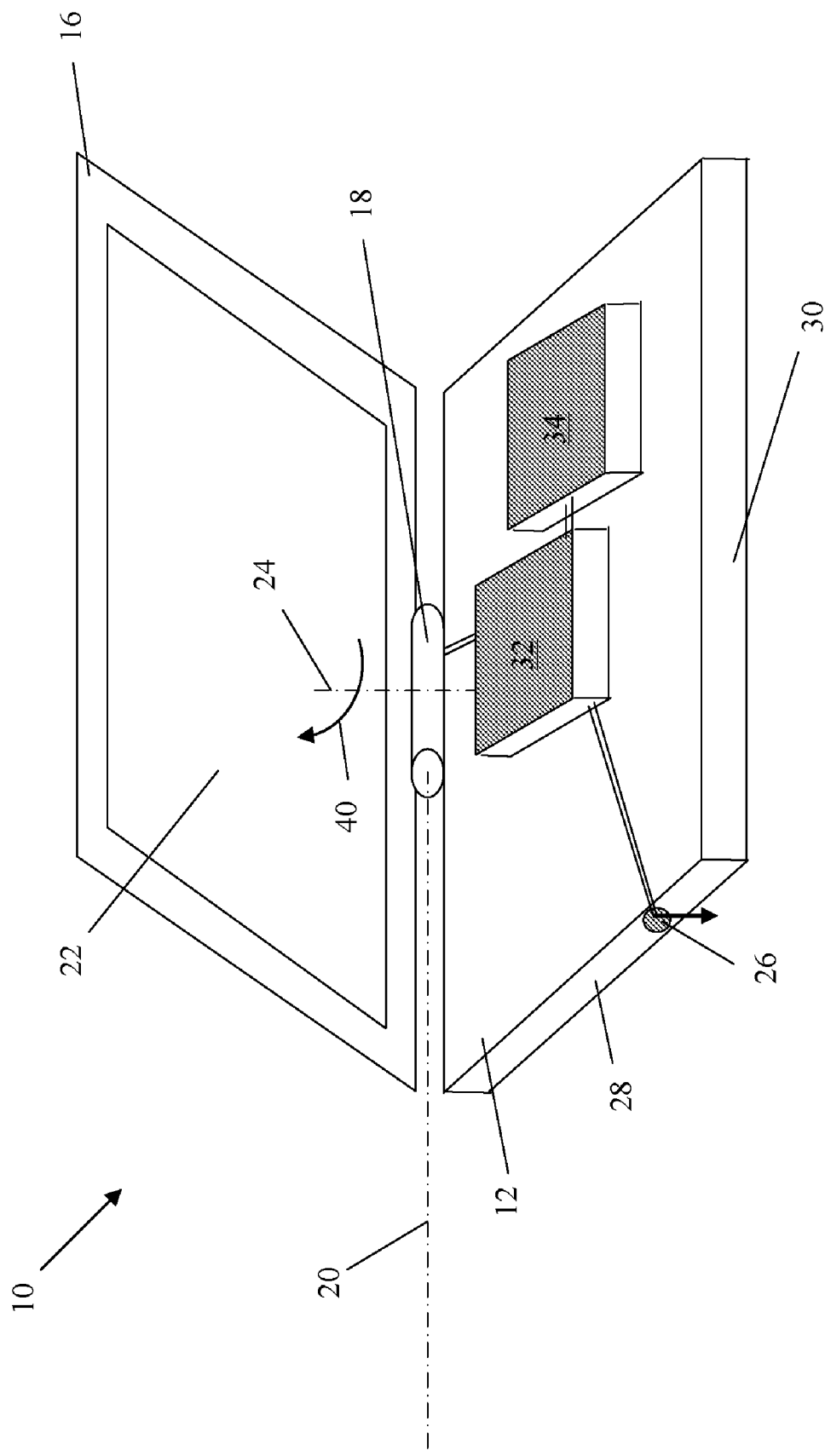
FIG. 5 illustrates an additional view of the laptop computer of FIG. 1 with a display in rotation about the second axis.

To articulate the display 16, the button 26 is moved thereby signaling the one or more motors 32 to drive the display 16 in an indicated direction. For example, as shown in FIG. 2, moving the button 26 forward from a home position 36 toward the hinge mechanism 18 results in the motors 32 actuating the hinge mechanism 18 to move the display 16 away from the keypad 14 toward an open position by rotation about the hinge axis 20. Referring to FIG. 3, moving the button 26 along the side face 28 away from the hinge mechanism 18 results in the motors 32 actuating the hinge mechanism 18 to move the display 16 toward the keypad 14 toward a closed position by rotation about the hinge axis 20. Referring to FIG. 4, when the button 26 is moved upward toward the keypad 14, the motors 32 move the display 16 in a counterclockwise direction 38 about the rotation axis 24 so the display face 22 rotates to a user's right. Referring to FIG. 5, when the button 26 is moved downward away from the keypad 14, the motors 32 move the display 16 in a clockwise direction 40 about the rotation axis 24 so the display face 22 rotates to the user's left. The assignment of display 16 movement directions to button 26 movement directions described herein is merely exemplary, other assignments and relationships between button 26 movement and display 16 movement are contemplated within the scope of the present disclosure. Movement of the display 16 continues until the button 26 is released and returns to the home position 36 or until a mechanical or electrical limit on a range of motion of the display 16 is reached.

In some embodiments, a correlation of button 26 movement distance to a movement angle of the display 16 can be modified by the user through a setting on the laptop computer 10.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A laptop computer comprising:
   a body;
   a display articulably coupled to the body;
   at least one drive unit capable of moving the display relative to the body; and wherein the at least one drive unit is capable of moving the display transversely across a keyboard face of the body.

2. A laptop computer comprising:
   a body;
   a display articulably coupled to the body;
   at least one drive unit capable of moving the display relative to the body;
   at least one activator in operable communication with the at least one drive unit wherein a movement of the at least one activator is capable of causing the drive unit to move the display relative to the body; wherein the at least one activator is articulable in a plurality of activator directions and wherein the plurality of activator directions is four activator directions.

3. A laptop computer comprising:
   a body;
   a display articulably coupled to the body;
   at least one drive unit capable of moving the display relative to the body;
   at least one activator in operable communication with the at least one drive unit wherein a movement of the at least one activator is capable of causing the drive unit to move the display relative to the body; and wherein the at least one activator is at least one button.

* * * * *